Aug. 14, 1945.   V. F. ZAHODIAKIN   2,382,766
CONTROL MECHANISM
Filed Oct. 28, 1942   2 Sheets-Sheet 2
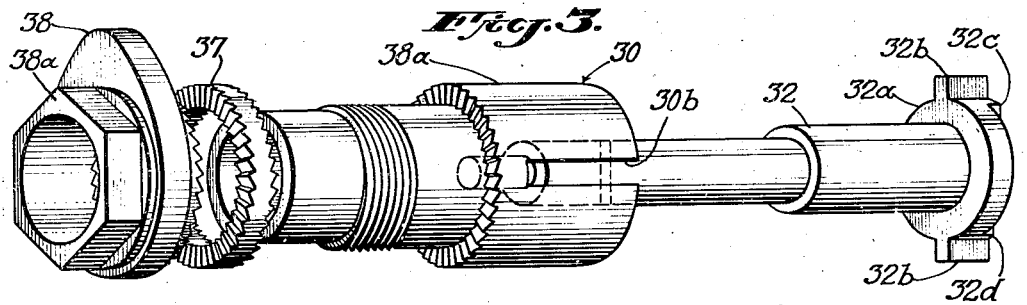
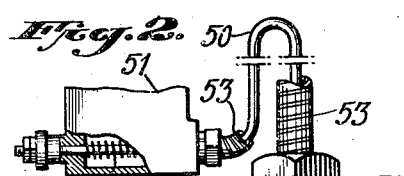
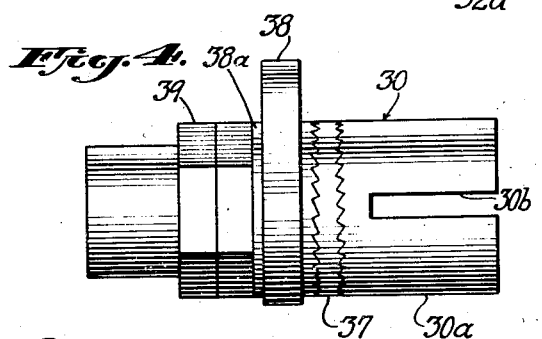
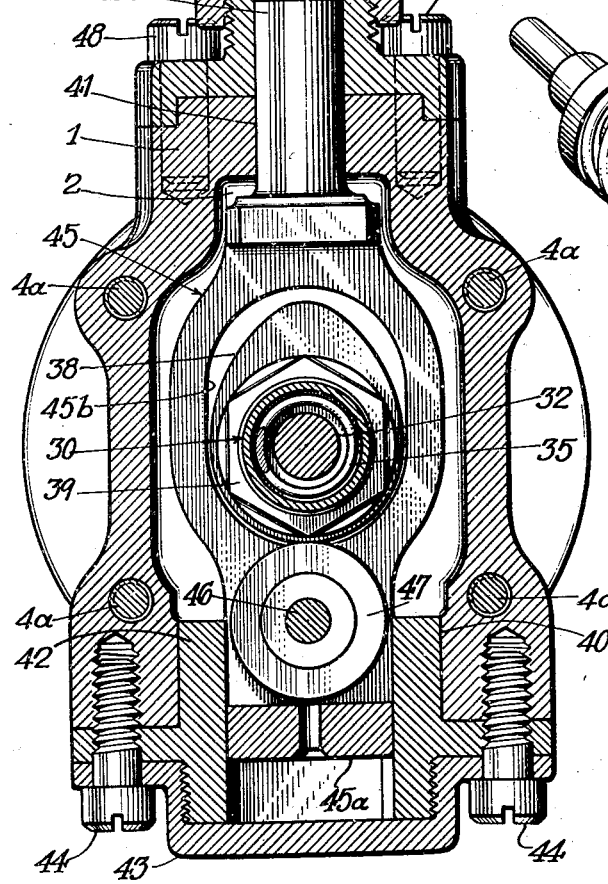
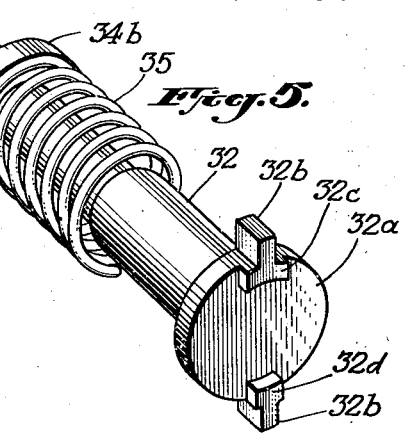
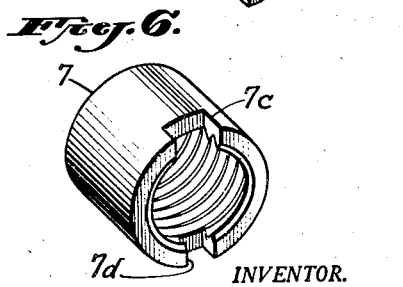
INVENTOR.
VICTOR F. ZAHODIAKIN.
BY
Ward, Crosby & Neal
ATTORNEYS Patented Aug. 14, 1945

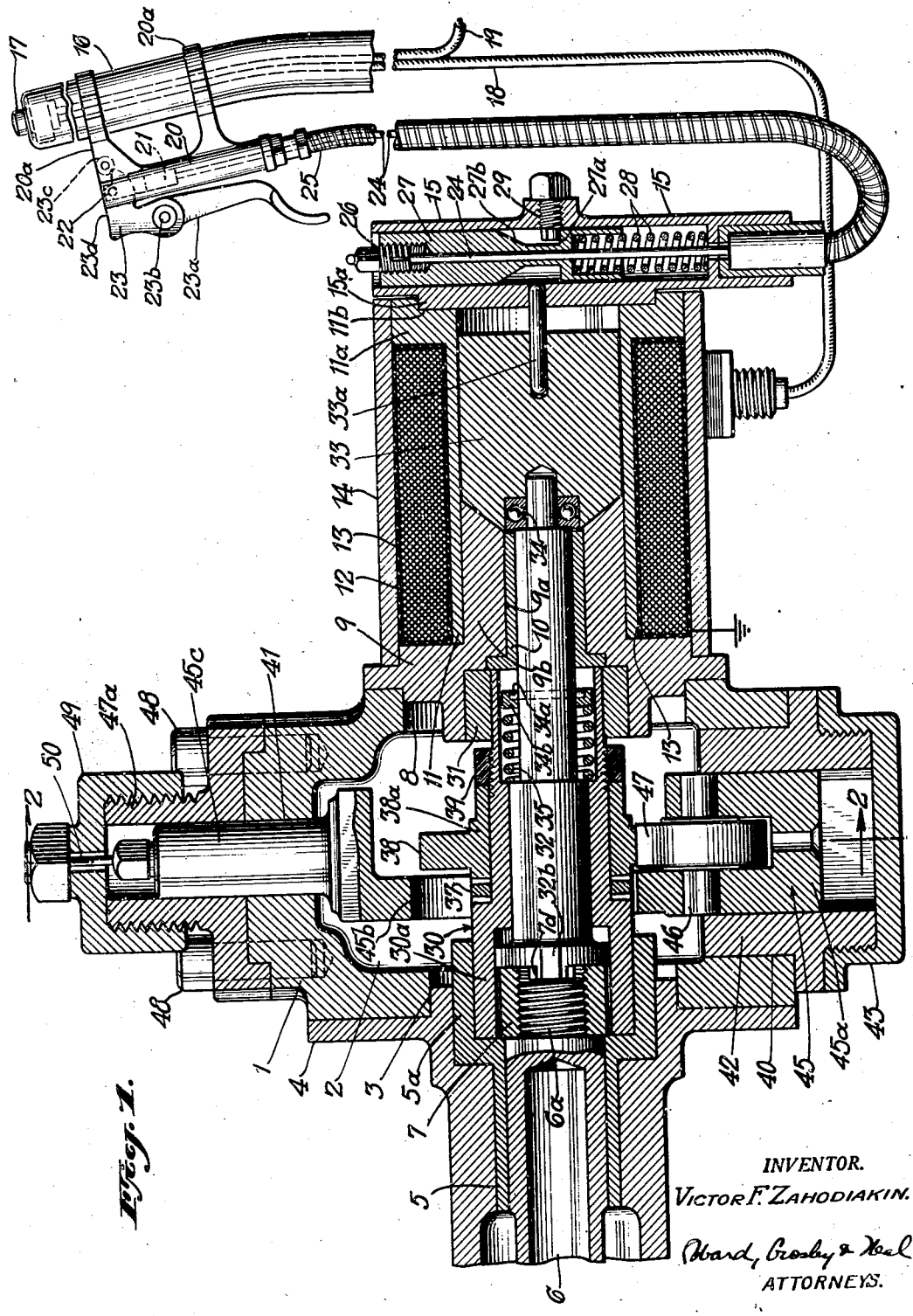

2,382,766

UNITED STATES PATENT OFFICE 2,382,766

CONTROL MECHANISM

Victor F. Zahodiakin, Short Hills, N. J.

Application October 28, 1942, Serial No. 463,599

13 Claims. (Cl. 192—67)

My invention relates to control mechanism of the type comprising a cam for periodically actuating a cam follower which, in the same periodic manner, actuates a suitable control member such, for example, as the member which effects the firing operation of a machine gun or the like.

My invention, in one important aspect thereof, relates to mechanism of the character described wherein a tubular cam-carrying member is mounted for rotatable movement about a fixed axis, said tubular member having an operating shaft disposed therein for longitudinal movement in opposite directions, said tubular member and said shaft being connected together by a mechanical connection and clutch mechanism being provided for connecting said shaft to a constantly rotating shaft, said mechanical connection and said clutch mechanism forming a combination novel in the art.

My invention, in another important aspect thereof, relates to a mechanical arrangement for synchronizing the firing of a machine gun with an aircraft propeller, said mechanical arrangement embodying features new and advantageous in the art.

My invention, in another important aspect thereof, relates to mechanism for synchronizing the firing of a machine gun with an aircraft propeller, such mechanism being operable as desired by separate control systems.

Various other objects, advantages and features of my invention will become apparent from the following detailed description.

My invention resides in the control mechanism, cam-carrying and cam-actuating mechanism, features and combinations of the character hereinafter described and claimed.

The mechanism disclosed in this application is an improvement, in some respects, on the mechanism disclosed in my pending application Serial No. 454,908, filed August 15, 1942.

For an understanding of my invention and for an illustration of one of the forms thereof, reference is to be had to the accompanying drawings, in which:

Figure 1 is a longitudinal, vertical sectional view, partly in elevation, showing the control mechanism of my invention;

Fig. 2 is a transverse, vertical sectional view, partly in elevation, taken on the line 2—2 of Fig. 1 looking in the direction of the arrows;

Fig. 3 is a perspective view showing some of the parts of my novel control mechanism disposed in dis-assembled relation;

Fig. 4 is an elevational view showing the arrangement of Fig. 3 with the parts in assembled relation;

Fig. 5 is a perspective view showing the cam-operating shaft and its biasing spring; and Fig. 6 is a perspective view showing a collar which is carried by a power-applying shaft.

In one of its important aspects, my invention relates to a control mechanism utilizable for synchronizing with an aircraft propeller the firing operation of a machine gun, a gun of other desired type, or other suitable projecting device, such guns or projecting device being hereinafter generically termed a "machine gun." In a more general aspect, my invention relates to control mechanism comprising an actuating cam and an actuated cam follower which delivers energy impulses to any selected member or equivalent having any desired control, indicating or other operative function.

Referring to Figs. 1 and 2, I have illustrated a housing 1 which defines an interior chamber 2, the housing 1, in the vertical side wall thereof toward the left, Fig. 1, being provided with a circular opening 3 which communicates with said chamber 2. In alinement with the opening 3, a head or cap 4 is secured exteriorly to said vertical side wall by screws or studs 4a, Fig. 2. This head 4 is provided with a central passage in which is disposed a sleeve 5 fixed to the head 4 in suitable manner, said sleeve 5 comprising a tubular end section 5a forming a passage utilizable as hereinafter described. The sleeve 5 supports a shaft 6 which terminates in a threaded section 6a to which is threaded a clutch collar 7, Figs. 1 and 6, the flat side of this collar at the left, Fig. 1, engaging the flanged end of the shaft 6. With an arrangement of this character, the clutch collar 7 is secured to the shaft 6 for rotatable movement therewith as a unit. As shown particularly in Fig. 6, one end face of the clutch collar 7 is formed with diametrically alined recesses 7c and 7d, the upper recess 7c, Fig. 6, having greater width than the lower recess 7d for a purpose hereinafter to be described.

The vertical side wall of the housing toward the right, Fig. 1, is provided with a circular opening 8 which is horizontally alined with the aforesaid housing opening 3. A solenoid or electromagnetic pole structure 9 formed from suitable magnetic material is secured exteriorly to said last named side wall in alinement with and closing the opening 8 by suitable screws or the like, not shown. The pole structure 9 is provided centrally thereof with a passage 9a which extends horizontally therethrough and which is lined with a bushing 10 formed from suitable non-magnetic material such, for example, as brass, bronze or the like.

The pole structure 9 comprises a longitudinally extending section 9b of reduced diameter to which a sleeve 11 is suitably secured, as by a press-fitting operation. The sleeve 11 has a solenoid coil or winding 12 wound or disposed thereon in any other suitable manner, the coil 12 being enclosed by electricity-insulating members 13, as shown. The coil 12 is housed by a cylindrical shell 14 which, at one end, rests upon the pole structure 9. The ends of the sleeve 11 and the shell 14 toward the right, Fig. 1, terminate in a vertical plane which is common to the end of the enlarged section 11a of the sleeve 11, said enlarged end 11a comprising a circular recess or depression 11b which receives a projecting section 15a of a housing 15, the sleeve 11, the shell 14 and the housing 15 being secured in assembled relation by any suitable means, not shown.

Carried by the control stick handle 16 of the airplane on which is mounted the control mechanism herein described is a suitable switch 17 which, by the application of thumb or finger pressure, is adapted to close the circuit of a pair of conductors 18 and 19, the conductor 18 being connected, in electricity-insulating relation, with one terminal of the coil 12, the other terminal of which is grounded onto the metallic shell 14 and the conductor 19 being suitably connected to said shell 14.

As shown in Fig. 1, the handle 16 has a housing 20 secured thereto in suitable manner, as by the clamps 20a. Slidably mounted in the upper end of the housing 20 is a member 21 which is pivoted at 22 to an actuating member 23 which has an actuating lever handle 23a secured thereto by a connection 23b which, preferably, is of such character that the lever handle 23a may be secured to the actuating member 23 in a desired adjustable relation. The upper clamp 20a carries a roller 23c with which the upper flat surface 23d of the actuating member 23 is coactable in the manner hereinafter described. Connected to the lower end of the member 21 is one end of a flexible wire 24 movable in a cable 25 connected at its opposite respective ends to said housings 15 and 20. The other end of the flexible wire 24 is suitably connected, as by the threaded device 26, to a plunger 27 mounted for reciprocatory movement in the housing 15, said plunger 27 and the associated end of the flexible wire 24 being biased in an upward direction, Fig. 1, by a helical spring 28 disposed in the lower end of said housing 15. The plunger 27 comprises two oppositely disposed chambers. One of these chambers comprises a wall surface 27a with which is coactable the end of a screw 29 threaded through the adjacent chamber wall. The other chamber comprises a cam surface 27b utilizable as hereinafter described.

As shown in Fig. 1, a cam-carrying tubular member 30 is journalled for rotatable movement in the chamber 2 of the housing 1, the head 4 and the pole structure 9 serving to rotatably support said tubular member 30. To this end and as illustrated, the pole structure 9, concentrically with respect to its passage 9a is shaped to form a circular recess which receives and supports a collar 31 adapted to form a bearing at one end of the tubular member 30. The other end of the tubular member 30 is received and supported in the above described passage formed by the tubular end section 5a of the sleeve 5. In this manner, the tubular member 30 is supported for free rotatable movement in the horizontal position shown in Fig. 1, longitudinal movement of said tubular member 30 being prevented by reason of the fact that the opposite end surfaces thereof engage the respective flanged sections of the sleeve 5 and the bushing 10.

The passage of the tubular member 30 receives and supports a shaft 32 in freely slidable relation. This shaft 32 comprises a circular head 32a which is freely slidable in a passage formed by an enlarged tubular section 30a of the tubular member 30, the diameter of said head 32a being substantially the same as that of the aforesaid clutch collar 7. The tubular section 30a is provided with longitudinally extending slots 30b, diametrically arranged, which receive the respective lugs 32b suitably secured to the shaft head 32a. In this manner, the tubular member 30 and the shaft 32 are connected together for rotatable movement as a unit (whenever rotatable movement is imparted to the shaft 32 as hereinafter described) while permitting free longitudinal movement of the shaft 32 with respect to the tubular member 30.

The end section of the shaft 32 toward the right, Fig. 1, extends freely through and is supported by the aforesaid bushing 10, the extreme end of said shaft 32 being connected to a solenoid core member 33 freely slidable in a chamber formed by a part of the aforesaid sleeve 11. As shown, an anti-friction thrust bearing 34 is disposed between a shouldered end of the shaft 32 and said core member 33. The core member 33 carries a longitudinally extending member 33a which extends freely through a passage provided therefor in the housing section 15a. Under certain circumstances as hereinafter described, the aforesaid cam surface 27b of the plunger 27 is adapted to coact with the member 33a.

As shown in Fig. 1, a pin 34a extends through the shaft 32 and forms an abutment for a ring 34b against which is seated one end of a helical spring 35 disposed within one end of the tubular member 30 and around a reduced section of said shaft 32, the other end of said spring 35 seating against a flanged surface of said tubular member 30.

The aforesaid lugs 32b comprise, respectively, the lug sections 32c and 32d, Fig. 5, arranged at the periphery of the shaft head 32a, these lug sections 32c and 32d having peripheral length slightly less than that of the respective clutch collar recesses 7c and 7d described above.

As shown on the drawings, the cam-carrying tubular member 30 comprises a section on which a clutch ring 37, the hub 38a of a cam 38 and a locking nut 39 are mounted. Opposite faces of the clutch ring 37 are serrated as indicated in Figs. 1, 3 and 4. One set of these serrations cooperates with similar serrations formed on the face of the tubular section 30a of the tubular member 30. The other set of these serrations cooperates with similar serrations formed on the adjacent face of the cam hub 38a.

The tubular member 30 comprises a threaded section with which the locking nut 39 is associated, this locking nut 39 when threaded to its limit toward the left, Fig. 1, coacting with the cam hub 38a to hold the latter together with the clutch ring 37 in proper operative relation, that is, with the serrations on one face of the clutch ring 37 engaging the serrations on the tubular sections 30a and with the serrations on the other face of said clutch ring 37 engaging the serrations on the cam hub 38a.

The hereinbefore described housing 1 has formed therein lower and upper passages 40 and 41 which are disposed in vertical alinement when the mechanism is positioned as shown in Fig. 1. The lower passage 40 has a sleeve 42 seated therein and the lower open end of this sleeve 42 is closed by a cap member 43, the sleeve and cap member being secured to the housing 1 by screws 44, or equivalent, Fig. 2.

The passage defined by the sleeve 42 receives, in freely slidable and non-rotatable relation, the non-circular base 45a of a cam follower 45, said base 45a supporting a pin 46 carrying a cam roller 47 with which the cam 38 is coactable in the manner hereinafter described.

The cam follower 45 comprises an intermediate section formed with an elliptical opening 45b or equivalent, Fig. 2, through which extends the aforesaid tubular member 30 and shaft 32, the opening 45b being of such size and shape as to prevent mechanical interference between the tubular member 30, the cam hub 38a together with the clutch ring 37 on the one hand and the cam follower 45 on the other hand during reciprocation of the latter.

The cam follower 45 further comprises an upper section 45c freely slidable in the upper passage 41 of the housing 1 and in the alined passage of a threaded nozzle 47a secured to said housing 1 by screws 48 or the like.

A cap member 49 secured to the nozzle 48 is provided with an opening through which extends a wire 50. One end of this wire 50 is connected to the cam follower 45 and the other end thereof is connected to a suitable trigger motor 51, for example, as known in the art of firing machine guns and comprising a helical spring 52 tending to draw the cam follower 45 in an upward direction, Figs. 1 and 2. As shown, the wire 50 may be enclosed by a suitable cable 53, Fig. 2.

The hereinbefore described shaft 6 has connected thereto a shaft, not shown, which is rotated by the aircraft engine. After installation on an aircraft of a device of the character described, the shaft 6 should be operatively connected to the aircraft engine as described above and the wire 50 should be connected to the trigger motor 51. Thereupon, with the aircraft engine non-operative, the aircraft propeller is moved manually to the position which it is to occupy, approximately, when a bullet from the machine gun is to fired between the propeller blades, such movement of the aircraft propeller being accompanied, of course, by movement of the engine pistons, crank shaft and the herein described shaft 6. As hereinafter described, the bullet is fired when the high section of the cam 38 moves the cam follower 45 downwardly, Figs. 1 and 2, against the action of the trigger motor spring 52.

After the aircraft propeller has been moved to the position described above and while it remains stationary, the screws or studs which retain the pole structure 9 on the housing 1 are removed whereupon the entire solenoid structure is removed as a unit from the casing 1, the tubular member 30 and the shaft 32. Thereupon, the shaft 32 is moved longitudinally to cause the lugs 32c, 32d to be disposed within the respective recesses 7c, 7d. While the shaft 32 is thus positioned, the locking ring 39 is retracted on the tubular member 30 and the cam 38 moved rotatably on said tubular member 30 to such position that the high section of said cam 38 assumes its lowermost position to thereby hold the cam follower 45 in its lowermost position whereby the trigger motor spring 52 is compressed to its maximum extent, this being necessary, as known in the art, to cause the machine gun to be fired. Thereupon, the locking ring 39 is moved to the position shown in Fig. 1 to thereby positively retain the cam 38 in its selected position. The clutch ring 37, the opposite sets of teeth of which are staggered, serves, in the described positioning of the cam 38, to introduce a "fineness" of adjustment otherwise not obtainable.

During flight of the aircraft and while the machine gun is non-operative, the shaft 32 is held by the spring 35 in its extreme position toward the right, Fig. 1, whereby the lugs 32c, 32d are disengaged from the respective recesses 7c, 7d. Accordingly, when the shaft 32 is positioned longitudinally as last described, the shaft 6 rotates freely but this rotation is without effect on the shaft 32 which remains stationary at this time.

When it becomes desirable or necessary to operate the machine gun, the circuit through the solenoid winding 12 is closed at the switch 17 whereby the core member 33 is moved from right to left, Fig. 1, to the position shown to thereby move the shaft 32 in the same direction and effect engagement of the lugs 32c, 32d with the respective recesses 7c, 7d, the core member 33 being magnetically held against the pole structure 9 and, hence, remaining stationary when positioned as last described, during continuous rotation of the shaft 32. By this action, the shaft 32 is connected to the constantly rotating shaft 6 and is rotated thereby at the same speed as said shaft 6. As described, the tubular member 30 is connected to the shaft 32 by the lugs 32b and, therefore, said tubular member 30 and the shaft 32 rotate together as a unit. The cam 38, which is carried by the tubular member 30, once for each revolution of said unit, engages the cam roller 47 to thereby move the cam follower 45 downwardly and effect the firing operation by actuation of the core member in the trigger motor 51.

When operation of the machine gun is to be discontinued, the switch 17 is released to thereby deenergize the solenoid winding whereupon, by action of the spring 35, the shaft 32 is moved longitudinally from left to right, to disengage the lugs 32c, 32d from the respective recesses 7c, 7d. Thereafter, while the solenoid winding remains deenergized, the shaft 32 together with the tubular member 30 remain stationary even though rotation of the shaft 6 continues so long as the aircraft motor continues to operate.

In the same sense as exists with respect to the mechanism disclosed in my aforesaid application Serial No. 454,908, filed August 15, 1942, an important feature of the present invention relates to the arrangement comprising the tubular member 30, the shaft 32 which is connected thereto by the lugs 32b and the associated parts. The trigger motor spring 52 holds the cam follower 47 constantly in engagement with the cam 38. At all times, therefore, lateral force is applied to the tubular member 30 by said spring 52. By reason of the fact that the tubular member 30 is journalled in bearings carried, respectively, by the head 4 and pole structure 9, such lateral force is dissipated in said bearings and is not applied to the shaft 32. The tubular member 30, then, shields the shaft 32 from the lateral force of the trigger motor spring 52 and (accordingly, said shaft 32 is freely movable in a longitudinal manner either under control of the electro-magnet or the spring 35. At the same time, by virtue of the connection comprising the lugs 32b and the slots 30b between the shaft 32 and the tubular member 30, the former serves its intended purpose of rotating the cam 38 to operate the trigger motor.

Accordingly, with an arrangement of the character described, the power of the solenoid winding 12 may be low compared with the solenoid power required by those prior art machine gun synchronizing devices wherein the force of the trigger motor spring is applied constantly to the cam shaft of the synchronizing mechanism. With the mechanism of my invention, by reason of the fact that the force of the trigger motor spring 52 is not applied to the shaft 32, it follows that energization of the solenoid winding 12 initiates firing of the machine gun instantly, positively and in a trouble-free manner. Further, particularly by reason of the low power required for operating purposes, the mechanism as a whole may be small and compact.

Still further, by reason of the low power requirements, it becomes practical to utilize the supplementary manual operating device as disclosed in the event of failure of the electrical control for the solenoid winding 12. As will be understood, when the control mechanism herein described is non-operative, the spring 35 holds the shaft 32, the core member 33 and its member 33a in a position toward the right, Fig. 1, whereby the free end of said member 33a is disposed in that chamber of the plunger 27 formed in part by the cam surface 27b. Accordingly, should closure of the electrical circuit by the switch 17 fail to produce operation of the machine gun under the control of the mechanism herein disclosed, the handle lever 23a is grasped and swung in a clockwise direction, Fig. 1, to cause engagement of the surface 23d of the member 23 with the roller 23c whereupon, continued movement of said lever handle 23a in the direction described causes the upper end of the attached wire 24 to be drawn upwardly, this producing downward movement of the plunger 27 against the action of the spring 28. As a result, the cam surface 27b engages the member 33a to thereby move the core member 33 and the shaft 32 from right to left, Fig. 1, to cause engagement of the described clutch mechanism and initiate the firing operation. When it becomes desirable to discontinue the firing operation, the handle lever 23a is swung in reverse direction to thereby restore the associated parts to the position thereof shown in Fig. 1, movement of the plunger 27 in an upward direction, Fig. 1, being discontinued when the plunger surface 27a comes into engagement with the screw 29. As will be understood, the arrangement comprising the wire 24 and cable 25 constitutes a Bowden wire device as known in the art.

From the foregoing description, it will be understood that whenever the described clutch mechanism is engaged, the same relation always obtains between the shafts 6 and 32. In other words, there is but one relative position of said shafts with respect to each other in which the lug sections 32c, 32d are disposed within the respective clutch collar recesses 7c, 7d.

The anti-friction thrust bearing 34, during rotation of the shaft 32, serves to decrease friction between the adjacent end of said shaft and the stationary core member 33. As stated, the shaft 32 operates freely on the application of lateral force and, therefore, when it is moved from right to left, Fig. 1, there is little shock or impact between the clutch faces when they engage. Compared with those prior art devices wherein the cam shaft rotates continuously, the mechanism disclosed herein is advantageous because decreasing bearing wear as well as wear on the cooperative cam surfaces, this desirable result being attained by reason of the fact that the tubular member 30 and the shaft 32 rotate only during continuance of the firing operation.

The mechanism of my invention is free from shims, eccentrics and the like as ordinarily used for adjusting purposes in prior art devices. Excepting the adjustment of the operating cam circumferentially of the tubular member 30, no other adjustments are required with respect to my novel mechanism which, therefore, is well adapted for installation and care by unskilled labor.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In mechanism of the character described, a shaft, means for rotating said shaft, means for moving said shaft longitudinally in one direction to a position wherein it is disconnected from the rotating means, a solenoid core member attached to one end of said shaft, an element attached to said core member and projecting therebeyond, and means for mechanically applying energy to the element to move the element, the core member, and the shaft longitudinally to connect the shaft to the means for rotating it.

2. In mechanism of the character described, a shaft, means for rotating said shaft, means for moving said shaft longitudinally in one direction to a position wherein it is disconnected from the rotating means, a solenoid core member attached to one end of said shaft, a member attached to said core member and projecting therebeyond, and means for mechanically applying energy to said second named member to thereby move said core member and said shaft longitudinally in reverse direction to connect it to said rotating means, said third named means comprising a spring-controlled plunger having a cam surface adapted to engage the end of said second named member.

3. In mechanism of the character described, a shaft, means for rotating said shaft, means for moving said shaft longitudinally in one direction to a position wherein it is disconnected from the rotating means, a solenoid core member attached to one end of said shaft, a member attached to said core member and projecting therebeyond, and means for mechanically applying energy to said second named member to thereby move said core member and said shaft longitudinally in reverse direction to connect it to said rotating means, said third named means comprising a spring-controlled plunger having a cam surface adapted to engage the end of said second named member, said third named means further comprising a flexible wire, an enclosing cable therefor together with an actuating member, said wire being connected to said plunger and to said actuating member.

4. In a control mechanism, the combination of a tubular member mounted for rotation and adapted to have a cam mounted thereon, bearings for the tubular member, a drive shaft axially aligned with the tubular member, a clutch element carried by the drive shaft and lying within the tubular member, a driven shaft mounted within the tubular member, means connecting the tubular member and the driven shaft for rotation in unison while permitting axial movement of the driven shaft, a clutch element on the driven shaft lying within the tubular member and engageable with the clutch element on the drive shaft, and means for moving the driven shaft axially in opposite directions to effect engagement and disengagement of the clutch elements.

5. In a control mechanism, the combination of a tubular member mounted for rotation and adapted to have a cam mounted thereon, bearings for the tubular member, a drive shaft axially aligned with the tubular member, a clutch element carried by the drive shaft, a shaft mounted within the tubular member for axial movement, means connecting the tubular member and the second shaft for rotation in unison while permitting axial movement of the second shaft, a clutch element on the second shaft engageable with the clutch element on the drive shaft, means operable to move the second shaft axially in one direction to effect engagement of the clutch elements, and spring means acting on the tubular member and the second shaft for biasing the second shaft axially to effect disengagement of the clutch elements.

6. In a control mechanism, the combination of a tubular member mounted for rotation and adapted to have a cam mounted thereon, bearings for the tubular member, a drive shaft axially aligned with the tubular member, a clutch element carried by the drive shaft, a shaft mounted within the tubular member for axial movement, means connecting the tubular member and the second shaft for rotation in unison while permitting axial movement of the second shaft, a clutch element on the second shaft engageable with the clutch element on the drive shaft, means acting on a portion of the second shaft exposed beyond the tubular member for moving said shaft axially in one direction to effect engagement of the clutch elements, and spring means within the tubular member acting on said member and the second shaft to bias said second shaft axially to effect disengagement of the clutch elements.

7. In a control mechanism, the combination of a tubular member mounted for rotation and adapted to have a cam mounted thereon, bearings for the tubular member, a drive shaft axially aligned with the tubular member, a clutch element carried by the drive shaft and lying within one end of the tubular member, a shaft mounted within the tubular member, means connecting the tubular member and the second shaft for rotation in unison while permitting axial movement of the second shaft, a clutch element on the second shaft lying within the tubular member and engageable with the clutch element on the drive shaft, means acting on the second shaft and operable to move it axially to effect engagement of the clutch elements, and a spring within the tubular member acting at one end on the tubular member and at the other on the second shaft, the spring tending to move the second shaft axially to effect disengagement of the clutch elements.

8. In a control mechanism, the combination of a tubular member mounted for rotation and adapted to have a cam mounted thereon, bearings for the tubular member, a drive shaft axially aligned with the tubular member, a clutch element carried by the drive shaft and lying within one end of the tubular member, a shaft mounted within the tubular member, means connecting the tubular member and the second shaft for rotation in unison while permitting axial movement of the second shaft, a clutch element on the second shaft lying within the tubular member and engageable with the clutch element on the drive shaft, means acting on the second shaft and operable to move it axially to effect engagement of the clutch elements, and a helical spring surrounding the second shaft within the tubular member and acting on said member and shaft to bias said shaft to effect disengagement of the clutch elements.

9. In a control mechanism, the combination of a tubular member mounted for rotation and adapted to have a cam mounted thereon, bearings for the tubular member, a drive shaft axially aligned with the tubular member, a clutch element carried by the drive shaft and lying within one end of the tubular member, a shaft lying within the tubular member and projecting out of the other end thereof, said shaft being axially movable, means connecting the tubular member and the second shaft for rotation in unison while permitting axial movement of said shaft, a clutch element on the second shaft lying within the tubular element and engageable with the clutch element on the drive shaft, solenoid means acting on the portion of the second shaft exposed beyond the tubular element for moving said shaft axially to effect engagement of the clutch elements, and spring means within said other end of the tubular element acting on the second shaft and biasing it to effect disengagement of the clutch elements.

10. In a control mechanism, the combination of a tubular member mounted for rotation and adapted to have a cam mounted thereon, bearings for the tubular member, a drive shaft axially aligned with the tubular member, a clutch element carried by the drive shaft and lying within the end of the tubular member, a shaft lying within the tubular member and projecting out of the other end thereof, said shaft being axially movable, means connecting the tubular member and the second shaft for rotation in unison while permitting axial movement of said shaft, a clutch element on the second shaft lying within the tubular element and engageable with the clutch element on the drive shaft, means acting on the portion of the second shaft exposed beyond the tubular element for moving said shaft axially to effect engagement of the clutch elements, a spring within said other end of the tubular member and encircling the second shaft, said spring acting at one end on the tubular member, and a collar on the second shaft acted on by the other end of the spring, said spring tending to move the second shaft to effect disengagement of the clutch elements.

11. In a control mechanism, a rotary shaft, drive means for the shaft, means for moving the shaft longitudinally in one direction to disconnect it from the drive means, a solenoid, a solenoid core attached to the shaft, energization of the solenoid being effective to move the shaft to connect it to its drive means, a member attached to the core and projecting beyond it, and means operable on the member to move the member, the core, and the shaft longitudinally to connect the shaft to the drive means, said means acting on the member including a plunger having a cam surface adapted to engage the end of the member, and flexible means for moving the plunger in one direction.

12. In a control mechanism, a rotary shaft, drive means for the shaft, means for moving the shaft longitudinally in one direction to disconnect it from the drive means, a solenoid, a solenoid core attached to the shaft, energization of the solenoid being effective to move the shaft to connect it to its drive means, a member attached to the core and projecting beyond it, and means operable on the member to move the member, the core, and the shaft longitudinally to connect the shaft to the drive means, said means acting on the member including a plunger having a cam surface adapted to engage the member to move it, a spring tending to move the plunger in one direction, and flexible means for moving the plunger in the opposite direction.

13. In a control mechanism, the combination of a tubular member mounted for rotation and adapted to have a cam mounted thereon, bearings for the tubular member, a drive shaft axially aligned with the tubular member, clutch means carried by the drive shaft and lying within the tubular member, a driven shaft mounted within the tubular member, means for connecting the driven shaft and the tubular member for rotation in unison while permitting axial movement of the second shaft, clutch means on the second shaft lying within the tubular member and engageable with the clutch means on the drive shaft, the driven shaft having a portion extending out of the tubular member, a solenoid having a pole structure with a passage through which the driven shaft extends and also having a core operatively connected to the exposed portion of the driven shaft, the solenoid being operable to move the driven shaft endwise in one direction, and a spring acting on the tubular member and the driven shaft and tending to move the latter endwise in the opposite direction.

VICTOR F. ZAHODIAKIN.